(12) United States Patent
Yamamoto

(10) Patent No.: US 9,569,708 B2
(45) Date of Patent: Feb. 14, 2017

(54) WRITING DEVICE AND METHOD

(75) Inventor: Kenta Yamamoto, Singapore (SG)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 292 days.

(21) Appl. No.: 13/600,411

(22) Filed: Aug. 31, 2012

(65) Prior Publication Data

US 2013/0057393 A1 Mar. 7, 2013

(30) Foreign Application Priority Data

Sep. 5, 2011 (JP) ................... 2011-193215

(51) Int. Cl.
*G08C 17/02* (2006.01)
*G06K 17/00* (2006.01)

(52) U.S. Cl.
CPC ................. *G06K 17/0025* (2013.01)

(58) Field of Classification Search
CPC .. G06K 19/0723; G06K 7/0008; G06K 17/00; G06K 7/10336; G06K 1/125; B41L 47/34; B41L 47/36; B41L 47/42; B41L 47/44; B41L 47/46
USPC .......... 340/10.51; 235/432, 433, 492
See application file for complete search history.

(56) References Cited

U.S. PATENT DOCUMENTS

| | | | | |
|---|---|---|---|---|
| 8,289,556 B2* | 10/2012 | Tomono | ............ | H04N 1/00931 358/1.1 |
| 2005/0147441 A1* | 7/2005 | Van Bever | ............ | B41J 3/4075 400/70 |
| 2006/0124723 A1* | 6/2006 | Satake et al. | ............ | 235/375 |
| 2006/0171753 A1* | 8/2006 | Fessler | ............ | B41J 11/44 400/76 |
| 2006/0255140 A1* | 11/2006 | Jusas | ............ | G06K 5/02 235/451 |
| 2007/0070383 A1* | 3/2007 | Fujimori | ............ | H04N 1/32138 358/1.13 |
| 2007/0268322 A1* | 11/2007 | Kyoi | ............ | B41J 3/4075 347/16 |
| 2008/0141886 A1* | 6/2008 | Whitelaw | ............ | B41F 13/14 101/484 |

(Continued)

FOREIGN PATENT DOCUMENTS

JP 09-207388 8/1997
JP 2004-102610 4/2004

(Continued)

OTHER PUBLICATIONS

Japanese Office Action for Japanese Application No. 2011-193215 mailed on Jul. 23, 2013.

*Primary Examiner* — An T Nguyen
(74) *Attorney, Agent, or Firm* — Amin, Turocy & Watson LLP

(57) ABSTRACT

A writing device comprises a carrying section configured to carry a plurality of tags written with information by way of wireless communication, a writing section configured to write the information into the tags which are carried to a set writing position by the carrying section by way of wireless communication, an accepting section configured to accept the input of the writing position where the writing section writes the information into the tags, when the information is written into the tags which are carried by the carrying section and a correcting section configured to correct the set writing position according to the writing position where the accepting section accepts the input.

5 Claims, 3 Drawing Sheets

(56) References Cited

U.S. PATENT DOCUMENTS

| | | | |
|---|---|---|---|
| 2008/0266579 A1* | 10/2008 | Suzuki | G06F 17/212 358/1.1 |
| 2009/0067910 A1* | 3/2009 | Sugiyama | B41J 3/4075 400/76 |
| 2010/0208292 A1* | 8/2010 | Tomono | H04N 1/00931 358/1.15 |
| 2010/0219253 A1* | 9/2010 | Katsumata | G06K 7/10316 235/492 |
| 2012/0050442 A1* | 3/2012 | Yamamoto | B41J 3/50 347/110 |
| 2013/0057393 A1* | 3/2013 | Yamamoto | G06K 17/0025 340/10.51 |

FOREIGN PATENT DOCUMENTS

| | | |
|---|---|---|
| JP | 2006-116886 | 5/2006 |
| JP | 2006-212894 | 8/2006 |
| JP | 2010-191659 | 9/2010 |
| JP | 2010-231667 | * 10/2010 |

* cited by examiner

WRITING DEVICE AND METHOD

CROSS-REFERENCE TO RELATED APPLICATION

This application is based upon and claims the benefit of priority from Japanese Patent Application No. 2011-193215, filed Sep. 5, 2011, the entire contents of which are incorporated herein by reference.

FIELD

Embodiments described herein relate to a writing device and a method.

BACKGROUND

In the prior art, a writing position where information is written into RFID tags is set in a bar code printer having a RFID reader-writer which writes the information into the carried RFID (Radio Frequency Identification) tags, under the offline mode (system mode) that the RFID reader-writer does not write the information into the RFID tag.

DETAILED DESCRIPTION

In accordance with an embodiment, A writing device comprises a carrying section configured to carry a plurality of tags written with information by way of wireless communication, a writing section configured to write the information into the tags which are carried to a set writing position by the carrying section by way of wireless communication, an accepting section configured to accept the input of the writing position where the writing section writes the information into the tags, when the information is written into the tags which are carried by the carrying section and a correcting section configured to correct the set writing position according to the writing position where the accepting section accepts the input.

Hereinafter, in reference with figures, a RFID bar code printer (called as a RFID printer hereinafter) of the embodiments is detailed. The RFID printer has a printing function for printing all kinds of information, and a wireless communication function for writing and reading information into and out of the RFID tags by means of wires communication. Furthermore, in the embodiments, the detailed RFID printer not only has the wireless communication function but also has the printing function, but is not limited thereby, as long as the existence of the writing device which has the wireless communication function leastways.

In view of this, said RFID (Radio Frequency Identification) tag, in a tag (a minute wireless IC chip) memory information for distinguishing a material such as ID information and the like, exchanges the information by way of short-distance (frequency band is from cm to m) wireless communication such as electromagnetic field, radio wave and the like, so as to distinguish the material.

Figure 1:
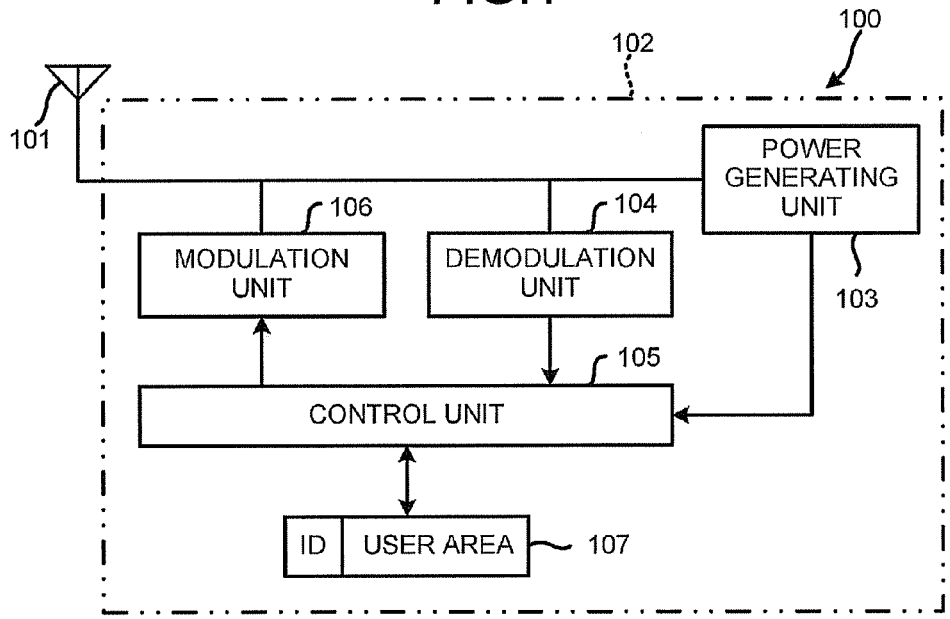
FIG. 1 is a diagram showing key units composition of a common RFID tag.

FIG. 1 is a diagram showing key units composition of a common RFID tag. As shown in FIG. 1, a RFID tag 100 comprises an antenna 101 and an IC chip 102. The IC chip 102 comprises a power generating unit 103, a demodulation unit 104, a modulation unit 106, a control unit 105, memory units 107 and the like, wherein the power generating unit 103 rectifies and stabilizes a modulating wave received by the antenna 101, to power each unit of the IC chip 102; the demodulation unit 104 demodulates the modulating wave and transmits the same to the control unit 105; the modulation unit 106 modulates data transmitted by the control unit 105 and transmits the same to the antenna 101; the control unit 105 writes the data demodulated by the demodulation unit 104 into the memory units 107, or reads the data from the memory units 107 and transmits the same to the modulation unit 106; and the memory units 107 are an EEPROM (Electrically Erasable Programmable Read Only Memory) and the like to be capable of carrying out non-volatile overwrite. The memory units 107 prestore inherent distinguishing information which is distributed and set by a manufacturer during the manufacturing phase of the RFID tag 100, that is to say ID. Furthermore, the memory units 107 are guaranteed to be internally provided with a user area capable of leading a user to write any data.

Figure 2:
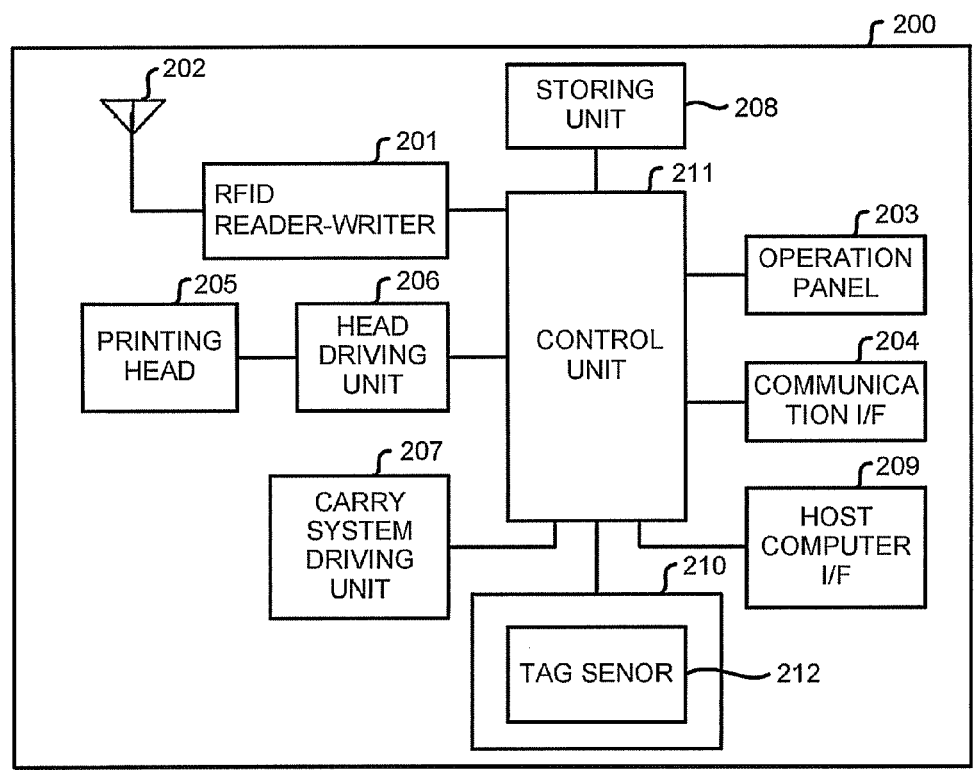
FIG. 2 is a block diagram showing key units composition of a RFID printer of the embodiments.
Figure 3:
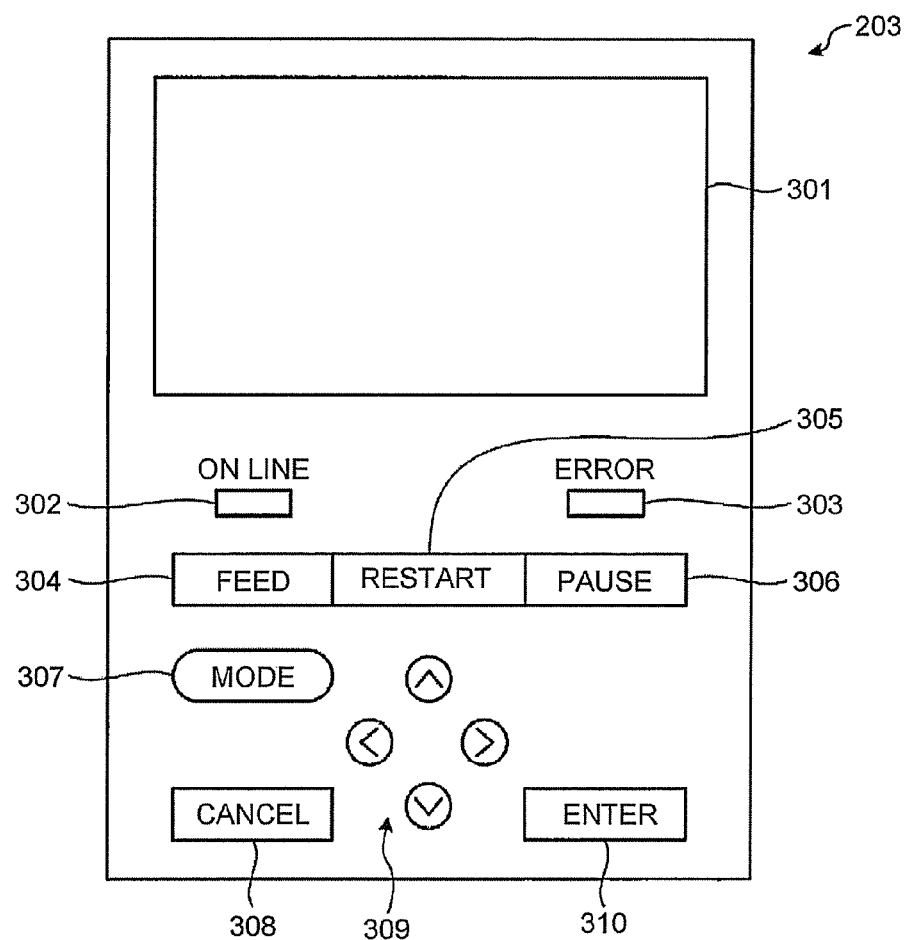
FIG. 3 is a skeleton diagram showing an operation panel of the RFID printer of the embodiments.

Then, key units composition of the RFID printer of the embodiments is detailed in reference to FIG. 2 and FIG. 3. FIG. 2 is a block diagram showing key units composition of a RFID printer of the embodiments. FIG. 3 is a skeleton diagram showing an operation panel of the RFID printer of the embodiments.

As shown in FIG. 2, a RFID printer 200 (a writing device) comprises a RFID reader-writer 201, an antenna 202, an operation panel 203, a communication interface (I/F) 204, a printing head 205, a head driving unit 206, a carry system driving unit 207, a memory unit 208, a host computer interface (I/F) 209, various sensors 210, a control unit 211, etc.

The carry system driving unit 207 is a carrying section which sequentially carries RIFD tags 100 in a mutual communication area with the antenna 202. In the embodiments, the carry system driving unit 207 comprises a paper pressing roller which clamps the RIFD tags 100 with the oppositely-configured printing head 205 to carry the RIFD tags 100, and a step motor, which rotates according to a pulse signal input by the control unit 211 at a preset set step unit, to drive the paper pressing roller.

Various sensors 210 respectively comprise a tag sensor 212 taken as an optical sensor, etc. The tag sensor 212 is arranged nearby the antenna 202, to detect the end of the upstream side of the carrying direction of the RIFD tags 100 carried by the carry system driving unit 207.

The antenna 202 sends out a modulating wave fed by the RFID reader-writer 201, and receives the modulating wave sent out by the RIFD tags 100 after receiving the modulating wave.

The RFID reader-writer 201, aiming at the RIFD tags 100 which are carried to the set writing position by the carry system driving unit 207, sends out the modulating wave from the antenna 202, writes the information into the memory units 107 of the RIFD tags 100 existed in the mutual communication area to which the sent modulating wave can reach by way of wireless communication, and reads the information from the memory units 107 by way of wireless communication. That is to say, in the embodiments, the antenna 202 and the RFID reader-writer 201 are respectively used as writing units.

In view of this, the set writing position is the position where the information is written into the RIFD tags 100 (the memory units 107). In the embodiments, the set writing position, in the set information 400 (stored in FIG. 4), is represented by the number of the pulse signal input into the step motor of the carry system driving unit 207, after the tag sensor 212 detects the end of the downstream side of the carrying direction of the RIFD tags 100.

For example, in the case that the set writing position is '3', the RFID reader-writer 201, after the sensor 212 detects the end of the downstream side of the carrying direction of the RIFD tags 100, when a third pulse signal is input into the step motor of the carry system driving unit 207, writes the information into the memory units 107 of the RIFD tags 100 and reads the information from the memory units 107.

The printing head 205 is arranged at the lower downstream side of the antenna 202 along with the carrying direction of the RIFD tags 100, and is driven by the head driving unit 206, to print all kinds of information (bar codes, texts and the like) on the printing surfaces of the RIFD tags 100. The printing head 205 can use a hot stamping head for example. The head driving unit 206 prints the information on the printing surfaces of the RIFD tags 100 which are carried to the position of the printing head 205 by the carry system driving unit 207. That is to say, in the embodiments, the printing head 205 and the head driving unit 206 are respectively used as printing units.

The operation panel 203 is provided with various keys, display units and the like for operation. In the embodiments, the operation panel 203 comprises a display unit 301, a mode display unit 302, an error display unit 303, a feed button 304, a restart button 305, a pause button 306, a mode switch button 307, a cancel button 308, a cursor key 309, an enter key 310, etc.

The display unit 301 is an LCD (Liquid Crystal Display) and the like to display a position input menu and the like for inputting the writing position where the information is written into the memory units 107 of the RIFD tags 100.

The mode display unit 302 is an LED (Light Emitting Diode) and the like, which is turned on when the RFID printer 200 is an online mode to report the online mode at this moment. Furthermore, the mode display unit 302 is turned off when the RFID printer 200 is an offline mode to report the offline mode at this moment. Herein, said online mode is the mode under which the information is written into the RIFD tags 100. Furthermore, said offline mode is the mode under which the information is not written into the RIFD tags 100.

The error display unit 303 is the LED and the like, when the RFID printer 200 generates an error (for example, the information is unsuccessful to write into the RIFD tags 100), which is turned on to report the error.

The feed button 304 is the button which moves the RIFD tags 100 when the RFID printer 200 is the offline mode. The restart button 305 is the button which rewrites the information into the RIFD tags 100. The pause button 306 is the button which temporarily stops writing the information into the RIFD tags 100.

The mode switch button 307 is the button which switches the position input mode and the like for inputting the writing position where the information is written into the RIFD tags 100. Furthermore, the display unit 301, according to the condition that the mode switch button 307 switches the position input mode and the like, displays the position input menu and the like which displays the input writing position.

The cancel button 308 is the button which cancels the action writing the information into the RIFD tags 100, reading the information from the RIFD tags 100, etc. The cursor key 309 is the key which inputs the writing position and the like where the information is written into the RIFD tags 100. The enter key 310 is the key which indicates that the information is started to be written into the RIFD tags 100.

Return to FIG. 2, the communication interface 204 can be connected with various external devices.

The memory unit 208 stores a control program and the other various programs of the RFID printer 200, writing data (all kinds of information and the like) written into the memory units 107 of the RIFD tags 100, printing data (textual data, bar code and the like to be printed) printing the RIFD tags 100, set information, etc. Herein, the writing data is the information which should be written into the RIFD tags 100. The printing data is the information which should be printed on the printing surfaces of the RIFD tags 100.

The set information is various parameters set for the RFID printer 200, comprises each set related to the wireless communication of the RIFD tags 100 and each set related to the printing of the RIFD tags 100.

Figure 4:
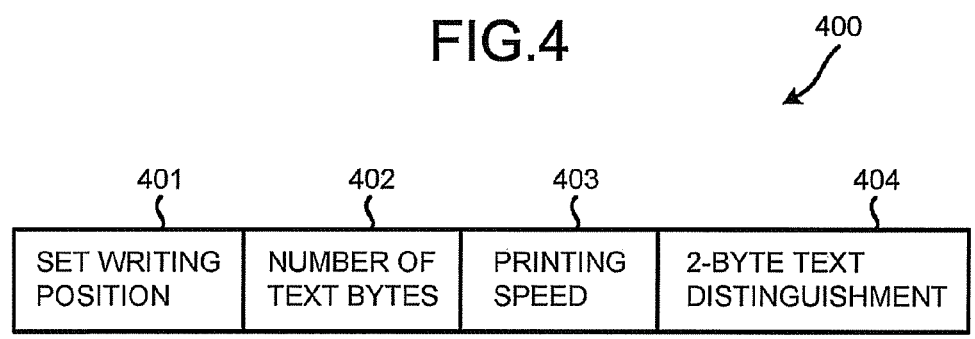
FIG. 4 is a diagram showing data composition of set information.

FIG. 4 is a diagram showing data composition of set information. As shown in FIG. 4, the set information 400 comprises a set writing position 401 to be taken as the set related to the wireless communication of the RIFD tags 100. The set writing position 401 is the position where the information is written into the RIFD tags 100 as the above, which is represented by the number of the pulse signal input into the step motor of the carry system driving unit 207, after the tag sensor 212 detects the end of the upstream side of the carrying direction of the RIFD tags 100.

Furthermore, as shown in FIG. 4, the set related to the printing of the RIFD tags 100 in the set information 400 comprises number (2 bytes or 1 byte) 402 of text byte, printing speed (set of line number printed within one second) 403, a 2-byte text distinguishment (set JIS bar code, GB bar code, KS bar code and the like) 404, etc.

Return to FIG. 2, the host computer interface 209 is an interface connected with a host computer device not shown in figures, which can transmit a unique ID read from the RIFD tags 100 and the data in the user area to the host computer device, etc.

The control unit 211 is used for jointly controlling the RFID reader-writer 201, the operation panel 203, the communication interface 204, the head driving unit 206, the carry system driving unit 207, the memory unit 208, the host computer interface 209 and various sensors 210, for example, can be realized by the means that the control program stored in the memory unit 208 is executed by a microprocessor.

Figure 5:
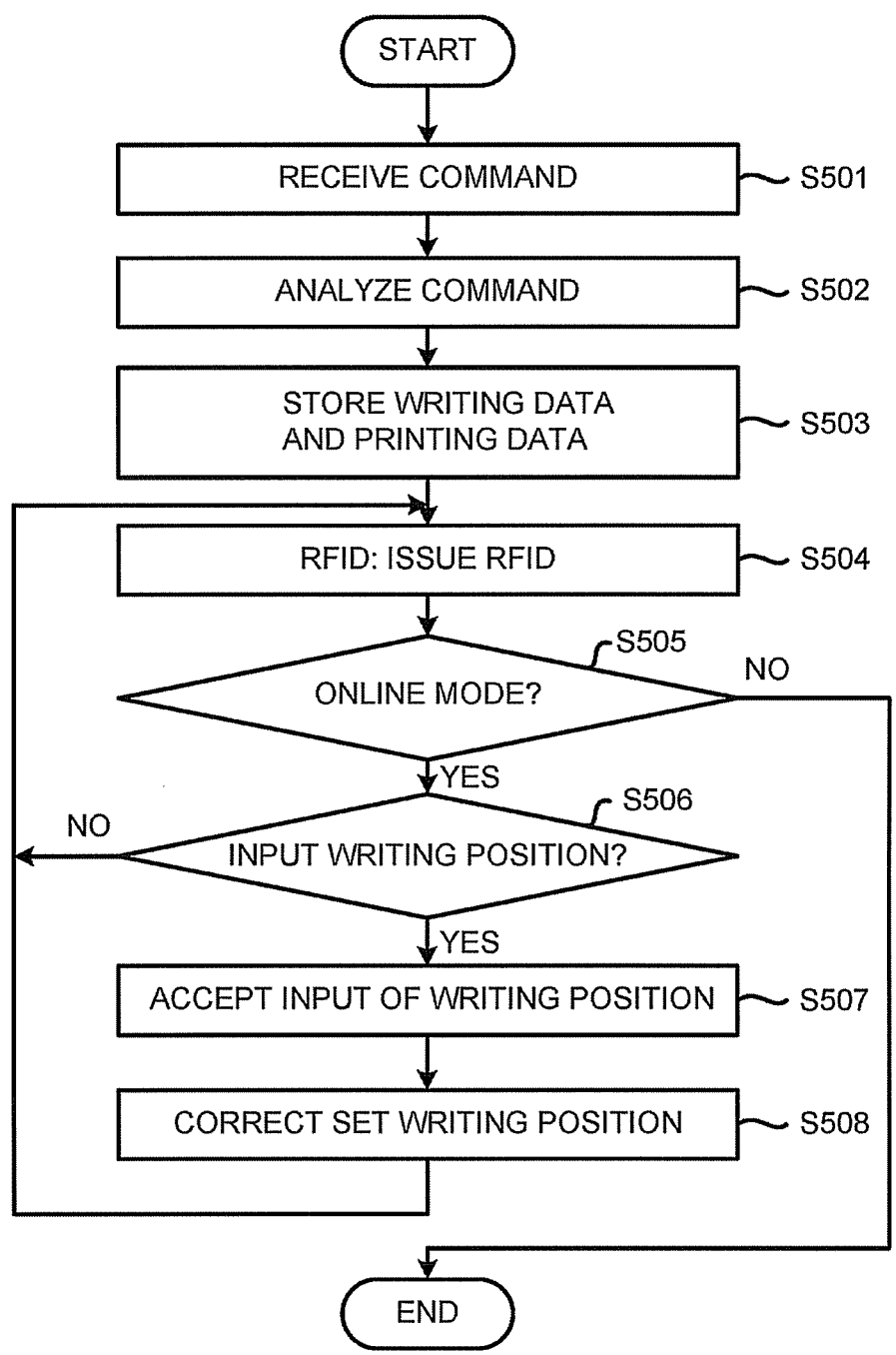
FIG. 5 is an action flow diagram of the RFID printer of the embodiments.

Then, an action of the RFID printer 200 formed by the mode is detailed in reference to FIG. 5. FIG. 5 is an action flow diagram of the RFID printer of the embodiments.

After a power supply of the RFID printer 200 is switched on, the control unit 211, through the host computer interface 209 from the host computer device which is not shown in the figures, receives a command comprising the writing data (for example, the information written into the 1000 RFID tags 100) written into the RIFD tags 100 and the printing data (for example, the information printing the 1000 RFID tags 100) printing the RIFD tags 100 (Act S501). The control unit 211 analyzes the received command (Act S502), and stores the writing data and the printing data included in the received command (Act S503).

Then, the control unit 211 starts to input the pulse signal into the step motor of the carry system driving unit 207, and starts to carry the RIFD tags 100. Furthermore, the control unit 211 inputs the writing data stored in the memory unit 208 to the RFID reader-writer 201, and inputs the printing data stored in the memory unit 208 to the head driving unit 206, so as to indicate the issue of the RIFD tags 100.

The RFID reader-writer 201, if indicating the issue of the RIFD tags 100, reads the set writing position 401 included in the set information 400 from the memory 208. Then, the RFID reader-writer 201 carries the RIFD tags 100 to the set writing position 401 read from the memory unit 208, and sends out the modulating wave from the antenna 202, so as to write the writing data into the RIFD tags 100 by way of wireless communication. Therefore, the RFID reader-writer 201 issues the RIFD tags 100 (Act S504).

Furthermore, the head driving unit 206 carries the RIFD tags 100 which is written with data by the RFID reader-writer 201 to the position of the printing head 205, and prints the data on the printing surfaces of the RIFD tags 100 by the printing head 205.

In addition, in the embodiments, the RFID reader-writer 201 writes the writing data into the RIFD tags 100, and sends out the modulating wave from the antenna 202, so as to read the writing data from the memory units 107 of the RIFD tags 100 written with the RIFD tags 100. The control unit 211 judges whether the writing data is read by the RFID reader-writer 201 or not, and detect that the writing data is unsuccessful to write into the RIFD tags 100. Then, in the case that the writing data is judged not to read from the memory units 107 of the RIFD tags 100 (that is to say, in the case that the writing data is detected to be unsuccessful to write into the RIFD tags 100), the control unit 211 turns on the error display unit 303, so as to report that the writing data is unsuccessful to write into the issued RIFD tags 100. Therefore, an operator of the RFID printer 200 can see whether the information is successful to write into the RIFD tags 100 or not.

In the embodiments, the writing data is reported to be unsuccessful to write into the RIFD tags 100 by turning on the error display unit 303, but not being limited thereby. For example, in the case that the writing data judges that the writing data is unsuccessful to write into the issued RIFD tags 100, the control unit 211 controls the head driving unit 206 to print the information (for example, the information showing the unsuccess of writing or blacking) besides the printing data on the printing surfaces of the RIFD tags 100, and reports that the writing data is unsuccessful to write into the issued RIFD tags 100.

Then, the control unit 211 judges whether the writing data is write into the RIFD tags 100 carried by the carry system driving unit 207 (that is to say, whether the online mode or not) (Act S505). In the case that the mode is judged to be offline mode (Act S505: No), that is to say, in the case that the writing data has been written into all the RIFD tags 100, the control unit 211 stops inputting the writing data into the RFID reader-writer 201, and stops inputting the printing data to the head driving unit 206, so as to stop the issue of the RIFD tags 100.

On the other hand, in the case that the mode is judged to be the online mode (Act S505: Yes), once the RIFD tags 100 are issued for once, the control unit 211 presses down the cursor key 309, and judges whether the writing position where the RFID reader-writer 201 writes the writing data into the RIFD tags 100 has been input or not (Act S506).

Furthermore, in the case that the writing position is not input (Act S506: No), the control unit 211 returns to the Act S504, to issue the RIFD tags 100.

In the embodiments, the operator of the RFID printer 200 presses down the mode switch button 307 to switch the RFID printer 200 to be position input mode, and presses down the cursor key 309 to input the writing position where the writing data is written into the RIFD tags 100. Furthermore, in the case that the RFID printer 200 is switched to be the position input mode, the display unit 301 displays a position input menu displaying the input writing position. Therefore, the operator can confirm the writing position displayed on the display unit 301, and can input the writing position.

In the case that the writing position where the writing data is written into the RIFD tags 100 is judged to be has been input (Act S506: Yes), the control unit 211 breaks key, and accepts the input of the writing position by the cursor key 309 (Act S507).

In the embodiments, if the cursor key 309 is pressed down for once, the control unit 211 takes the set writing position 401 included in the set information 400 stored in the memory unit 208 as the reference, to accept the input of the writing position moving along with the carrying direction of the RIFD tags 100 or the negative direction thereof according to the size of one pulse signal carried to the step motor of the carry system driving unit 207.

For example, in the case that the cursor key 309 showing a left direction in the cursor key 309 included in the operation panel 203 is pressed down, the control unit 211 takes the set writing position 401 as reference, to accept the input by taking the forward position of the size of one pulse signal carried to the step motor of the carry system driving unit 207 as the writing position. On the other hand, in the case that the cursor key 309 showing a right direction in the cursor key 309 included in the operation panel 203 is pressed down, the control unit 211 takes the set writing position 401 as reference, to accept the input by taking the backward position of the size of one pulse signal carried to the step motor of the carry system driving unit 207 as the writing position.

If the input of the writing position is accepted, the control unit 211, according to the wiring position where the input is accepted, corrects the set writing position 401 included in the set information 400 stored in the memory unit 208 (Act S508). Furthermore, after the writing position 401 included in the set information 400 stored in the memory unit 208 is corrected, the control unit 211 returns to the Act S504, to issue the RIFD tags 100.

Accordingly, the RFID printer 200 of the embodiments comprises the carry system driving unit 207, configured to carry the plurality of RIFD tags 100 written with the information by way of wireless communication; and the RFID reader-writer 201, configured to write the information into the RIFD tags 100 carried to the set writing position 401 by the carry system driving unit 207 by way of wireless communication; and when the information is written into the RIFD tags 100 carried by the carry system driving unit 207, the accepting section accepts the input of the writing position where the RFID reader-writer 201 writes the information into the RIFD tags 100, corrects the set writing position 401 according to the writing position where the input is accepted, during the online mode, and does not write the information into the RIFD tags 100 at a supposed writing position (that is to say within the mutual communication area of the antenna 202), in the case that the information is unsuccessful to write into the RIFD tags 100, and the RFID printer 200 can correct the set writing position 401 by the cursor key 309 during the online mode, so that even if the information is unsuccessful to write into the RIFD tags 100, the invalidation risk of the RIFD tags 100 also can be reduced.

Furthermore, the control program executed by the RFID printer 200 of the embodiments is provided by being pre-programmed into the ROM and the like, but not being limited thereby. The control program executed by the RFID printer 200 of the embodiments can be provided by being recorded into a computer-readable recoding medium such as the CD-ROM, the FD, the CD-R, the DVD (Digital Versatile Disk) and the like in an instable manner or an executable manner.

Furthermore, the control program executed by the RFID printer 200 of the embodiments further can be provided by being stored on a computer connected with the network such as the internet and the like, and being downloaded by the network. Furthermore, the control program executed by the RFID printer 200 of the embodiments further can be provided or issued by the network such as the internet, etc.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printer, comprising:
    a carrying section configured to carry a tag into which information is to be written by way of wireless communication, wherein the carrying section carries the tag for a distance proportional to a number of pulse signals input to the carry section;
    a writing section configured to read, from a memory section, a set writing position in the tag where information is written into the tag and to write the information into the tag which is carried to the set writing position by the carrying section by way of wireless communication to issue the tag, wherein the set writing position is a preset position corresponding to the preset number of pulse signals which is input to the carry section after a predetermined portion of a downstream side of a carrying direction by the carrying section of the tag is detected;
    a determination section configured to, after a command that instructs the writing section to write the information into the tag is received, determine, every time the tag into which the writing section writes the information is issued, whether an updated writing position where information is written into the tag is input as the updated number of pulse signals by a key provided on the printer while the information is written into the tag which is sequentially carried to the set writing position by the carrying section, wherein the updated writing position corresponds to a position moving, by a preset amount corresponding to the updated number of pulse signals from the set writing position as a reference, along with the carrying direction by the carrying section of the tag or an opposite direction of the carrying direction; and
    a correcting section configured to correct the set writing position stored in the memory section according to the input updated writing position when the determination section determines the updated writing position is input,
    wherein the writing section is configured to read the set writing position from the memory section every time the writing section issues the tag.

2. The printer according to claim 1, wherein the detecting section configured to detect that the information is unsuccessful to write into the tag by the writing section, and further comprising:
    a reporting section configured to report that the information is unsuccessful to write into the tag by printing the tag, if the information is detected to be unsuccessful to write into the tag by the writing section.

3. The printer according to claim 2, wherein
    the reporting section reports that the information is unsuccessful to write into the tag by printing an information on the tag, if the information is detected to be unsuccessful to write into the tag by the writing section.

4. The printer according to claim 1, wherein
    the correcting section corrects the set writing position according to the writing position moving along with the carrying direction of the tag or the negative direction thereof, takes the set writing position as reference.

5. A control method of a printer includes a carrying section configured to carry a tag into which information is to be written by way of wireless communication, wherein the carrying section carries the tag for a distance proportional to the number of pulse signals input to the carry section, and a writing section configured to read, from a memory section, a set writing position where information is written into the tag and to write the information into the tag which is carried to a set writing position by the carrying section by way of wireless communication to issue the tag, wherein the set writing position is a preset position corresponding to the preset number of pulse signals which is input to the carry section after a predetermined portion of a downstream side of a carrying direction by the carrying section of the tag is detected, comprising:
    after a command that instructs the writing section to write the information into the tag is received, determining, every time the tag into which the writing section writes the information is issued, whether an updated writing position where information is written into the tag is input as the updated number of pulse signals by a key provided on the printer while the information is written into the tag which is sequentially carried to the set writing position by the carrying section, wherein the updated writing position corresponds to a position moving, by a preset amount corresponding to the updated number of pulse signals from the set writing position as a reference, along with the carrying direction; and
    correcting the set writing position stored in the memory section according to the input updated writing position when the determination section determines updated the writing position is input,
    wherein the writing section reads the set writing position from the memory section every time the writing section issues the tag.

* * * * *